United States Patent [19]
Iwashita et al.

[11] 4,383,750
[45] May 17, 1983

[54] DRIVE CONTROL DEVICE IN CAMERA

[75] Inventors: Tomonori Iwashita, Fuchu; Hidehiko Fukahori, Yokohama, both of Japan

[73] Assignee: Canon Kabushiki Kaisha, Tokyo, Japan

[21] Appl. No.: 321,525

[22] Filed: Nov. 16, 1981

[30] Foreign Application Priority Data

Nov. 22, 1980 [JP] Japan .................................. 55-165070

[51] Int. Cl.³ .............................................. G03B 9/02
[52] U.S. Cl. .................................................. 354/271
[58] Field of Search ............... 354/195, 230, 270, 271, 354/266, 268, 234, 235, 40, 273, 274

[56] References Cited
U.S. PATENT DOCUMENTS 4,264,171 4/1981 Hahn et al. ..................... 354/270 X Primary Examiner—John Gonzales
Attorney, Agent, or Firm—Toren, McGeady and Stanger

[57] ABSTRACT

A camera mechanism is stopped from further movement at an adjusted position by an arresting member. The operation of the arresting member is controlled as a control member therefor is driven by an electromagnetic drive source. When the mechanism is rendered inoperative, the arresting member is held stationary by a prohibiting member. At the same time when an operation of the mechanism is initiated by an actuating member, motion of the actuating member also serves to take the prohibiting member out of connection with the arresting member. Then, upon driving the control member to move, the operation of the mechanism is terminated by the arresting member.

6 Claims, 4 Drawing Figures

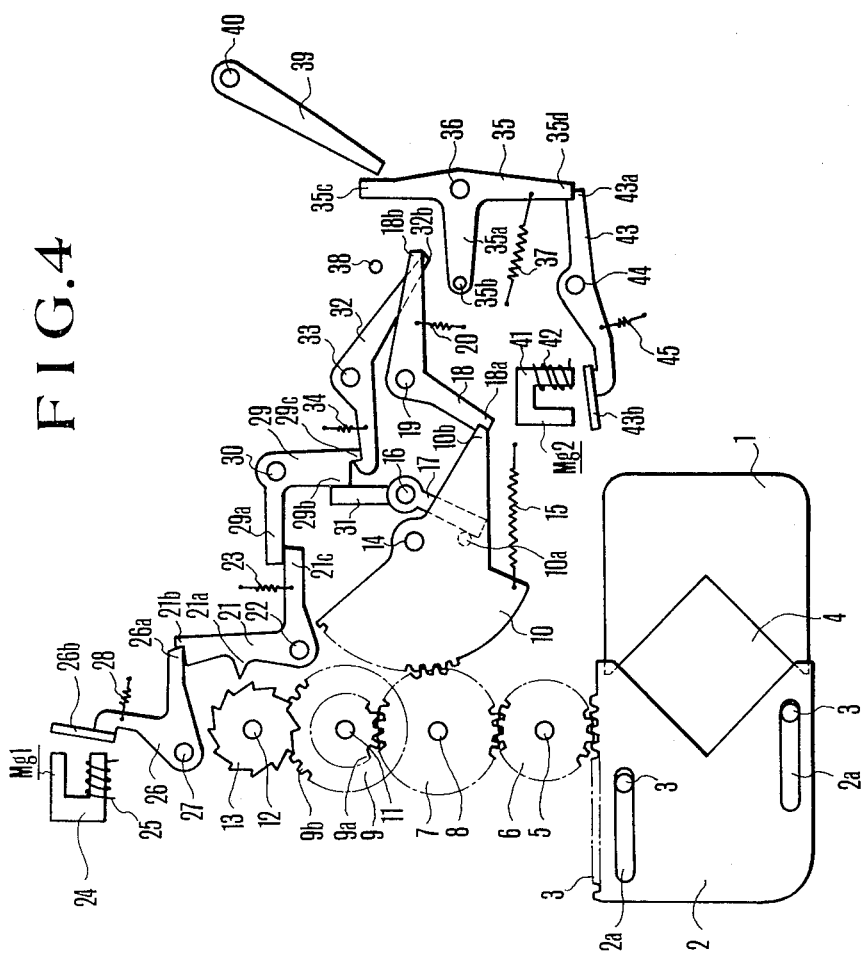

DRIVE CONTROL DEVICE IN CAMERA

BACKGROUND OF THE INVENTION

1. Field of the Invention

This invention relates to drive control devices in cameras, and more particularly to drive control devices in cameras where the drive stopping operation is controlled by an electromagnet.

2. Description of the Prior Art

The method of drive control of mechanisms in the interior of the camera, for example, a diaphragm mechanism has involved the use of a spring as the drive source, whereby actuation was accomplished through a release button, and to stop further movement, the deflected position of a meter needle or the like was sensed to mechanically effect the stopping operation. In recent years, however, with electronic advances, the electrically operated magnetic devices have found general use in controlling both the actuating and stopping operations. The use of an electromagnet obviates the necessity of using a complicated mechanism, and makes control easy, but it necessitates electrical power. Since cameras are of small size and light weight a battery of small capacity can only be used. This leads to the requirement for limiting the amount of electrical energy needed for the electromagnet to a minimum. In conventional instruments, therefore, in order to make the consumption of electrical energy by the electromagnet as small as possible and, with regard to the electromagnet controlling the stopping operation, in order to effect a response for the initiation of the stopping operation as soon as possible after the control signal from the electrical circuit is received, most efforts have been directed toward reduction of the load on the armature of the electromagnet to as small a value as possible. As a result, the camera suffers a disadvantage in that even a slight shock, for example, will cause accidental displacement of the armature which in turn causes failure to ensure further accurate control.

SUMMARY OF THE INVENTION

With the foregoing in mind, it is an object of the present invention to provide a drive control device for a camera in which the driving is controlled by using an electromagnet and which is free from faulty operation even when a great shock is imparted to the camera housing.

The various features of novelty which characterize the invention are set forth with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 4 is a plan view of the FIG. 1 embodiment in a charged position.

Figure 1:
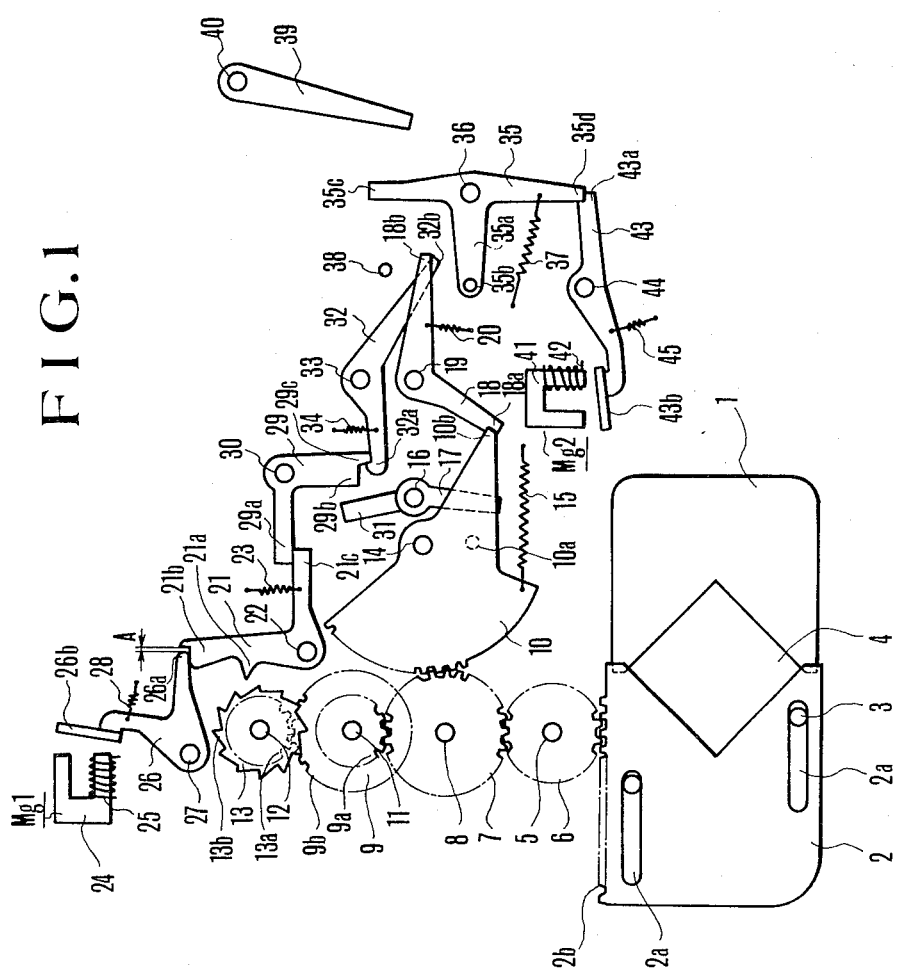
FIG. 1 is a plan view of an embodiment of the invention in a position ready for actuation of a camera release.

DETAILED DESCRIPTION OF THE PREFERRED EMBODIMENT:

In FIGS. 1 to 4, 1 is a stationary diaphragm blade, and 2 is a movable diaphragm blade having two elongated slots 2a through which guide pins 3 penetrate. As the blade 2 is laterally slidingly moved, the size of a diaphragm aperture 4 is varied to control the amount of light to a film (not shown). 2b is a rack gear cut in the upper edge of the movable diaphragm blade 2 and meshing with a first gear 6 rotatably mounted on a shaft 5. A second gear 7 is rotatably mounted on a shaft 8 and meshes with the first gear 5, a small gear 9a of a two-stage gear 9 and a sector gear 10. The two-stage gear 9 is rotatably mounted on a shaft 11 with its large gear 9b meshing with a gear 13a in unison with a stop wheel 13 which is rotatably mounted on a shaft 12. The sector gear 10 is pivotally mounted on a pin 14 and is urged by a drive spring 15 in a counterclockwise direction. A pin 10a is mounted on the sector gear 10 and arranged upon engagement with a first charge lever 17 to be charged in a clockwise direction. A sector latching lever 18 is pivotally mounted on a pin 19, with its one end 18a upon engagement with one end 10b of the sector gear 10 operating to latch the sector gear 10 in position against the force of a spring 20 which urges the lever 18 to turn in a counterclockwise direction.

21 is an arresting or stop lever rotatably mounted on a pivot pin 22 and having a pawl 21a which is arranged upon engagement with the ratchet 13b of the stop wheel to stop the driving of the movable diaphragm blade 2. A spring 23 urges the stop lever 21 in a counterclockwise direction. An electromagnet Mgl controlling the stopping operation has a yoke 24 and a coil 25. 26 is a latch lever pivotally mounted on a pin 27 with its one end 26a engaging with one end 21b of the stop lever 21 to limit the clockwise movement of the stop lever 21 and with its other end fixedly carrying an armature 26b to be attracted by the electromagnet Mgl. A spring 28 urges the latch lever 26 in a clockwise direction. 29 is a holding lever pivotally mounted on a pin 30 with its one end 29a engaging the other end 21c of the stop lever 21. 31 is a second charge lever pivotally mounted on a pin 16 which upon clockwise movement to engages with a convex portion 29b of the holding member and then through the holding lever 29 to charge the stop lever 21 to a clockwisemost position. 32 is a latch lever for the holding lever 29 pivotally mounted on a pin 33 with its pawl 32a upon engagement with the other end 29c of the holding lever 29 operating to prohibit counterclockwise movement of the stop lever 21 through the holding lever 29 and also to cause establishment of a gap of length A between one end 21b of the stop lever and one end 26a of the latch lever 26 so that even when the latch lever 26 turns in a counterclockwise direction, the stop lever 21 is prevented from counterclockwise movement. Also the holding latch lever 32 is urged by a spring 34 in a clockwise direction. 35 is a release lever pivotally mounted on a pin 36, and urged by a spring 27 in a clockwise direction. Mounted on one end 35a of the lever 35 is a pin 35b which will engage with the other end 18b of the sector latch lever 18 and one end 32b of the holding latch lever 32 when the release lever 35 turns in a clockwise direction, whereby the sector latch lever 18 and hold latch lever 32 are turned in the counterclockwise direction. 38 is a fixed pin. 39 is a third charge lever pivotally mounted on a pin 40 which upon clockwise movement will engage with the other end 35c of the release lever and to charge the release lever 35 in a counterclockwise direction. 41 is a yoke of an actuation control electromagnet Mg2, and 42 is a coil. 43 is a release latch lever pivotally mounted on a pin 44 with its one end 43a engaging the other end 35d of the release lever to inhibit clockwise movement of the release lever and with its other end fixedly carrying an armature 43b. A spring 45 urges the release latch lever in a counterclockwise direction.

The operation of the thus constructed embodiment of the invention is as follows: In a position ready for actuation of a camera release, all the levers assume their positions as illustrated in FIG. 1.

In the position of FIG. 1, the stop lever 21 is spaced apart from the stop latch lever 26 by a distance A and, therefore, is restricted in position not by the stop latch lever 26, but by the hold latch lever 32 through the holding lever 29. Therefore, even when the stop latch lever 26 is accidentally turned in the counterclockwise direction by a shock or the like, the stop lever 21 never turns in the counterclockwise direction.

Figure 2:
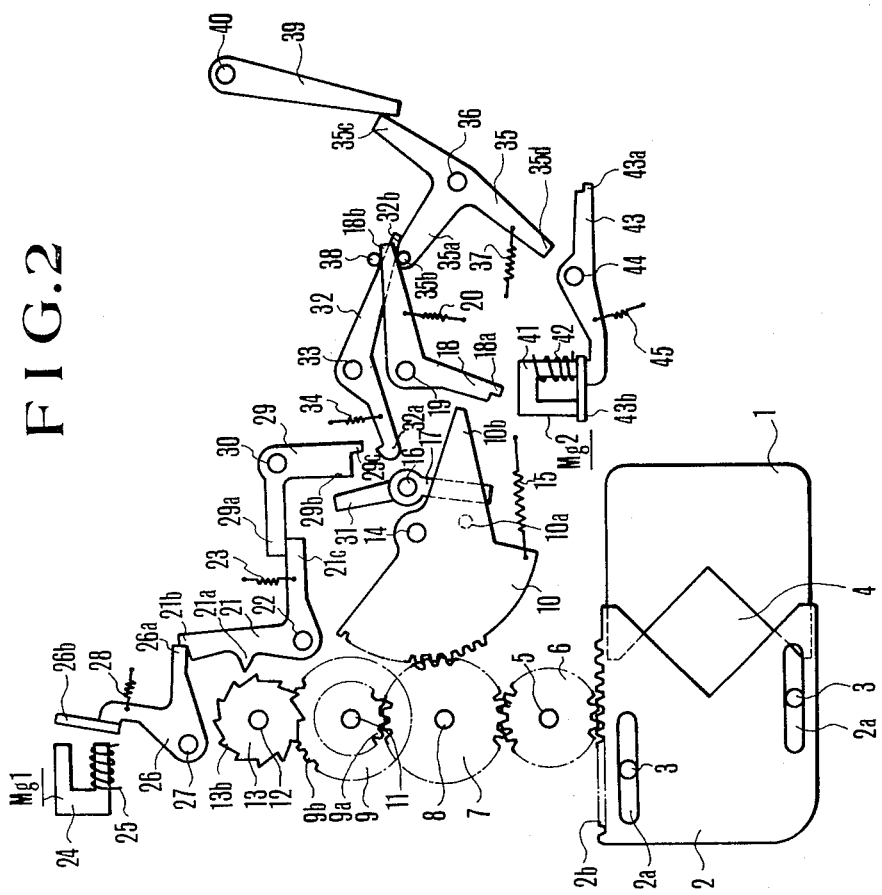
FIG. 2 is a plan view of the FIG. 1 embodiment in a driving position.
Figure 3:
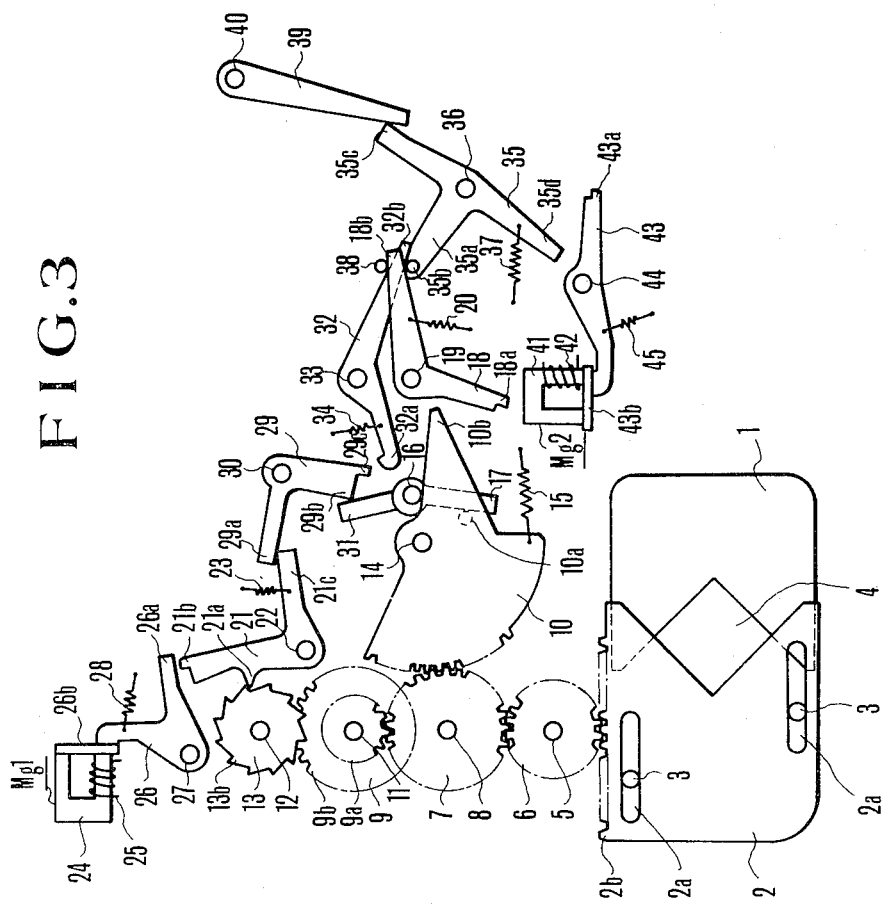
FIG. 3 is a plan view of the FIG. 1 embodiment in a driving-stopped position.

In the position of FIG. 1, when a release button (not shown) is pushed, the actuation control electromagnet Mg2 is supplied with current by an electrical circuit (not shown), and the armature 43b is attracted to the yoke 41, whereby the release latch lever 43 is turned in the clockwise direction against the spring 45 and the one end 43a of the release latch lever 43 is disengaged from the other end 35d of the release lever 35. Then, the release lever 35 turns in the clockwise direction under the action of the spring 37. Such movement causes the pin 35b to engage with the one end 32b of the hold latch lever 32 and then to turn the hold latch lever 32 in the counterclockwise direction against the spring 34 which in turn causes disengagement of the pawl 32a from the other end of the hold latch lever 29c. Then, as the stop lever 21 is released from the restriction by the hold latch lever 32, it is turned in the clockwise direction by the distance A under the action of the spring 23. In this turn, as shown in FIG. 2, the stop lever 21 is constrained from its rotation by the stop latch lever 26.

Again, the pin 35b while simultaneously engaging with the one end 32b of the hold latch lever 32 engages also with the other end 18b of the sector lever 18 and then turns said lever 18 in the counterclockwise direction against the spring 20, whereby the one end 18a of the said lever 18 is disengaged from the one end 10b of the sector gear 10. Then the sector gear 10 turns in the counterclockwise direction under the action of the drive spring 15. Motion of the sector gear 10 is transmitted through the gears 7 and 6 to move the movable diaphragm blade 2 to the right, and through the gears 7, 9a, 9b and 13a to turn the stop wheel 13 in the clockwise direction. (see FIG. 2). As the size of the aperture opening 4 varies, the intensity of light incident upon a photosensitive element (not shown) changes until a prescribed level is reached. Then, the stop control electromagnet Mg1 is supplied with current from a circuit (not shown). Then, the armature 26b is attracted to the yoke 25, causing the stop latch lever 26 to turn in the counterclockwise direction against the spring 28, whereby its one end 26a is disengaged from the one end 21b of the stop lever 21. Then, the stop lever 21 turns in the counterclockwise direction against the spring 23. Upon engagement of the pawl 21a with the ratchet 13b, the stop wheel 13 is stopped from further clockwise movement. Therefore, the counterclockwise movement of the sector gear is stopped through the gears 13a, 9b, 9a and 7, and the rightward movement of the movable diaphragm blade is also stopped through the gears 6 and 2b. Thus, the size of the aperture opening 4a is adjusted to the desired setting (see FIG. 3). Then, a shutter (not shown) is released by a control mechanism (not shown). After the exposure is terminated, when a film winding lever (not shown) is cocked, a winding operation occurs with the first, second and third charge levers turning in response to the winding lever. At first, clockwise movement of the third charge lever 39 causes the release lever 35 to be charged to the counterclockwise direction against the spring 37. Then, clockwise movement of the second charge lever 31 causes the stop lever 21 to be charged against the spring 23 through the holding lever 21. Finally, the first charge lever 17 charges the sector gear 10 to the clockwise direction against the spring 15, thus taking the position of FIG. 4. After all the charges have been completed, the first, second and third charge levers return to the initial positions and the actuation ready position as shown in FIG. 1 is regained.

As has been described above, according to the present invention, the stop member in the form of the lever 21 is not rendered cooperative with the control member therefor in the form of the latch lever 26 until the actuating member in the form of the release lever 35 is turned, but is constrained from rotative movement by the prohibiting member in the form of the latch lever 32. Therefore, for example, while the camera is being carried about, when a shock occurs to unintentionally turn the stop latch lever 26 in the counterclockwise direction against the spring 28, the stop lever 21 remains stationary. Further, the provision of the gap A between the stop lever 21 and stop latch lever 26 enables the stop latch lever 26 to return to the position of FIG. 1 by the spring 28 at a time when the shock disappears. Thus, it is made possible to prevent occurrence of faulty operation of the movable diaphragm blade 2 which would be otherwise caused when a shock is given to the camera housing, and to control the camera operation always with high accuracy and reliability.

It is also desirable that the time interval from the moment at which the stop control electromagnet Mg1 has been supplied with current to the moment at which the movable diaphragm blade 2 is stopped, or the pawl 21a drops in the stop wheel 13 is as short as possible. According to the present invention, the stop latch lever 26 is made to play in response to a shock with an advantage that the force of the spring 28 may be weakened. Therefore, the stop control electromagnet Mg1 can operate with small electrical power, and moreover the response time can be remarkably shortened. Although the above embodiment has been described in connection with the use of the actuation control electromagnet Mg2 for movement of the release latch lever 43, the release button may be used to otherwise actuate the release latch lever 43. Further, the present embodiment has been described as applied to the drive control of the diaphragm for the lens. But it is not confined thereto, and it is to be understood that the present invention is applicable to, for example, shutter mechanisms, focusing lens adjusting mechanisms in auto-focus cameras, and other mechanisms provided that the driving is initiated by an actuating member and terminated by the electromagnet.

While a specific embodiment of the invention has been shown and described in detail to illustrate the application of the inventive principles, it will be understood that the invention may be embodied otherwise without departing from such principles.

What is claimed is:

1. A drive control device in a camera comprising:
   electromagnetic drive means;
   drive means for actuating said camera;
   a stopping member for stopping the driving of said drive means;
   a biasing member;
   a control member actuated by said electromagnetic drive means operative to perform a shifting operation while resisting the biasing power of said biasing member by the attractive force of said electromagnetic drive means when power is supplied to said electromagnetic drive means to thus initiate a stopping operation of said stopping member; and
   a prohibiting member for prohibiting said stopping member from movement until the driving of said drive means is initiated.

2. A device according to claim 1, wherein said drive means performs a diaphragm closing down operation of the camera.

3. A drive control device in a camera comprising:
   first electromagnetic drive means;
   drive means for performing actuation of said camera;
   a stopping member for stopping the driving of said drive means;
   a control member which when actuated by said first electromagnetic drive means disengages from said stopping member, whereby said stopping member is caused to perform a stopping operation; and
   a prohibiting member for prohibiting said stopping member from movement until the driving of said drive means is initiated, and holding said stopping member in a position where it does not engage said control member.

4. A device according to claim 3, further including:
   an actuating member, for initiating driving of said drive means, and at the same time, releasing said stopping member from prohibition of movement by said prohibiting member.

5. A device according to claim 4, further including:
   second electromagnetic means, for controlling the actuation of said actuating member.

6. A device according to claim 5, wherein said drive means performs the diaphragm closing down operation of the camera.

* * * * *